(12) United States Patent
Legault et al.

(10) Patent No.: US 10,703,203 B2
(45) Date of Patent: Jul. 7, 2020

(54) VEHICLE DRIVELINE COMPONENT HAVING A TWO-SPEED TRANSMISSION AND A FAILSAFE SPRING CONFIGURED TO URGE THE TRANSMISSION INTO A DESIRED SPEED RATIO

(71) Applicant: BorgWarner Inc., Auburn Hills, MI (US)

(72) Inventors: Marc Legault, Oxford, MI (US); William Dodge, Commerce Township, MI (US); Gurmeet Singh Bedi, Rochester Hills, MI (US)

(73) Assignee: BorgWarner Inc., Auburn Hills, MI (US)

( * ) Notice: Subject to any disclaimer, the term of this patent is extended or adjusted under 35 U.S.C. 154(b) by 0 days.

(21) Appl. No.: 16/019,712

(22) Filed: Jun. 27, 2018

(65) Prior Publication Data
US 2020/0001713 A1    Jan. 2, 2020

(51) Int. Cl.
| | |
|---|---|
| *F16H 7/08* | (2006.01) |
| *B60K 25/06* | (2006.01) |
| *F16H 63/30* | (2006.01) |
| *F16H 59/70* | (2006.01) |
| *F16H 61/12* | (2010.01) |
| *F16D 13/68* | (2006.01) |
| *F16H 59/02* | (2006.01) |
| *F16H 3/44* | (2006.01) |

(52) U.S. Cl.
CPC ............. *B60K 25/06* (2013.01); *F16H 59/70* (2013.01); *F16H 61/12* (2013.01); *F16H 63/3043* (2013.01); *F16D 13/68* (2013.01); *F16H 3/44* (2013.01); *F16H 2007/087* (2013.01); *F16H 2059/0295* (2013.01); *F16H 2061/122* (2013.01); *F16H 2061/1272* (2013.01); *F16H 2063/3089* (2013.01)

(58) Field of Classification Search
CPC ...... F16H 61/12; F16H 59/70; F16H 63/3043; F16H 3/44; F16H 2061/1272; F16H 2007/087; F16H 2063/3089; F16H 2059/0295; F16H 2061/122; B60K 25/06; F16D 13/68
See application file for complete search history.

(56) References Cited

U.S. PATENT DOCUMENTS

| 7,240,577 B2 | 7/2007 | Choi et al. |
| 9,500,237 B2 | 11/2016 | Downs |
(Continued)

*Primary Examiner* — David J Hlavka
(74) *Attorney, Agent, or Firm* — Burris Law, PLLC (57) ABSTRACT

A vehicle driveline component having a housing, first and second shafts supported by the housing for rotation about a rotary axis, a two-speed transmission in a power transmission path between the first and second shafts, a shift fork and a failsafe spring. The two-speed transmission has a movable member that is movable along the rotary axis between a high-speed position, in which the two-speed transmission operates in a first gear ratio, and a low-speed position in which the two-speed transmission operates in a second gear ratio that provides a higher speed reduction between the first and second shafts than the first gear ratio. The shift fork is coupled to the movable member for movement therewith along the rotary axis. The failsafe spring is disposed coaxially about the rotary axis and biases the movable member toward the high-speed position.

13 Claims, 5 Drawing Sheets

(56) References Cited

U.S. PATENT DOCUMENTS

| | | | |
|---|---|---|---|
| 9,751,404 B2* | 9/2017 | Imafuku | B60K 17/34 |
| 9,989,151 B2* | 6/2018 | Imafuku | B60K 17/08 |
| 9,994,103 B2* | 6/2018 | Takaira | B60K 17/02 |
| 10,145,472 B2* | 12/2018 | Imafuku | B60K 17/02 |
| 2005/0277509 A1 | 12/2005 | Showalter | |
| 2013/0066529 A1* | 3/2013 | Murayama | F16H 61/12 |
| | | | 701/62 |
| 2016/0096429 A1* | 4/2016 | Imafuku | B60K 17/344 |
| | | | 180/233 |
| 2017/0234374 A1 | 8/2017 | Palazzolo et al. | |

* cited by examiner

VEHICLE DRIVELINE COMPONENT HAVING A TWO-SPEED TRANSMISSION AND A FAILSAFE SPRING CONFIGURED TO URGE THE TRANSMISSION INTO A DESIRED SPEED RATIO

FIELD

The present disclosure relates to a vehicle driveline component having a two-speed transmission and a failsafe spring that is configured to urge the transmission into a desired speed ratio.

BACKGROUND

This section provides background information related to the present disclosure which is not necessarily prior art.

Various vehicle driveline components, such as transfer cases, power take-off units and axle assemblies, can include a two-speed transmission having a transmission shaft or element that can be moved between two positions to cause the transmission to operate in two discrete speed or gear reductions ratios. A clutch or shift fork is often times employed to translate the transmission element along an axis between the two positions. The shift fork can be translated by any type of linear motor, such as a solenoid plunger, a hydraulic or pneumatic cylinder, or a follower that engages a rotary cam.

It is known in the art to provide a compliance spring in a force transmission path between the linear motor and the shift fork. In the event that movement of the transmission element along the axis in a first direction from a first position to a second position is blocked, for example when mating teeth on another element of the transmission are disposed in the path of teeth on the transmission element, the compliance spring permits the linear motor to be operated without causing corresponding axial motion of the shift fork. In this regard, the linear motor can be operated to store energy in the compliance spring. The energy stored in the compliance spring can be released to move the shift fork when movement of the transmission element is no longer blocked.

It is also known in the art to provide a return spring, which may or may not be used in conjunction with a compliance spring. The return spring is typically located between an output of the linear motor and the shift fork and is employed to bias the shift fork toward the output of the linear motor. The biasing of the shift fork correspondingly biases the transmission element along the axis in a second direction that is opposite the first direction.

One drawback associated with the known arrangements that employ a compliance spring and/or a biasing spring concerns a situation in which the transmission element becomes unresponsive to the output of the linear motor. This can happen, for example, if the shift fork were to break or to wear to the point where it is no longer connected to the hub. In such cases, the compliance spring and the biasing spring would have no effect on the positioning of the movable transmission element.

SUMMARY

This section provides a general summary of the disclosure, and is not a comprehensive disclosure of its full scope or all of its features.

In one form, the present disclosure provides a vehicle driveline component having a housing, first and second shafts supported by the housing for rotation about a rotary axis, a two-speed transmission in a power transmission path between the first and second shafts, a shift fork and a failsafe spring. The two-speed transmission has a movable member that is movable along the rotary axis between a high-speed position, in which the two-speed transmission operates in a first gear ratio, and a low-speed position in which the two-speed transmission operates in a second gear ratio that provides a higher speed reduction between the first and second shafts than the first gear ratio. The shift fork is coupled to the movable member for movement therewith along the rotary axis. The failsafe spring is disposed coaxially about the rotary axis and biases the movable member toward the high-speed position.

In another form, the present disclosure provides a method for operating a vehicle driveline component having a housing, first and second shafts supported by the housing for rotation about a rotary axis, a two-speed transmission in a power transmission path between the first and second shafts, a shift fork and an actuator. The two-speed transmission has a movable member that is movable along the rotary axis between a high-speed position, in which the two-speed transmission operates in a first gear ratio, and a low-speed position in which the two-speed transmission operates in a second gear ratio that provides a higher speed reduction between the first and second shafts than the first gear ratio. The movable member is coupled to the shift fork for movement therewith along the rotary axis. The actuator has a cam and a follower. The cam is rotatable about an axis that is parallel to the rotary axis. The follower is coupled to the shift fork and engages the cam. The method includes: transmitting rotary power from the first shaft through the two-speed transmission to the second shaft with the movable member in the high-speed position; operating the actuator to drive the cam about the cam axis in a first rotational direction such that the cam and the follower cooperate to translate the shift fork along the rotary axis to position the movable member in the low-speed position; transmitting rotary power from the first shaft through the two-speed transmission to the second shaft with the movable member in the low-speed position; and applying a force to the movable member via a failsafe spring that is disposed coaxially about the rotary axis, wherein the force applied by the failsafe spring is sufficient to move the movable member into the high-speed position when movement of the shift fork along the rotary axis is unresponsive to rotation of the cam.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
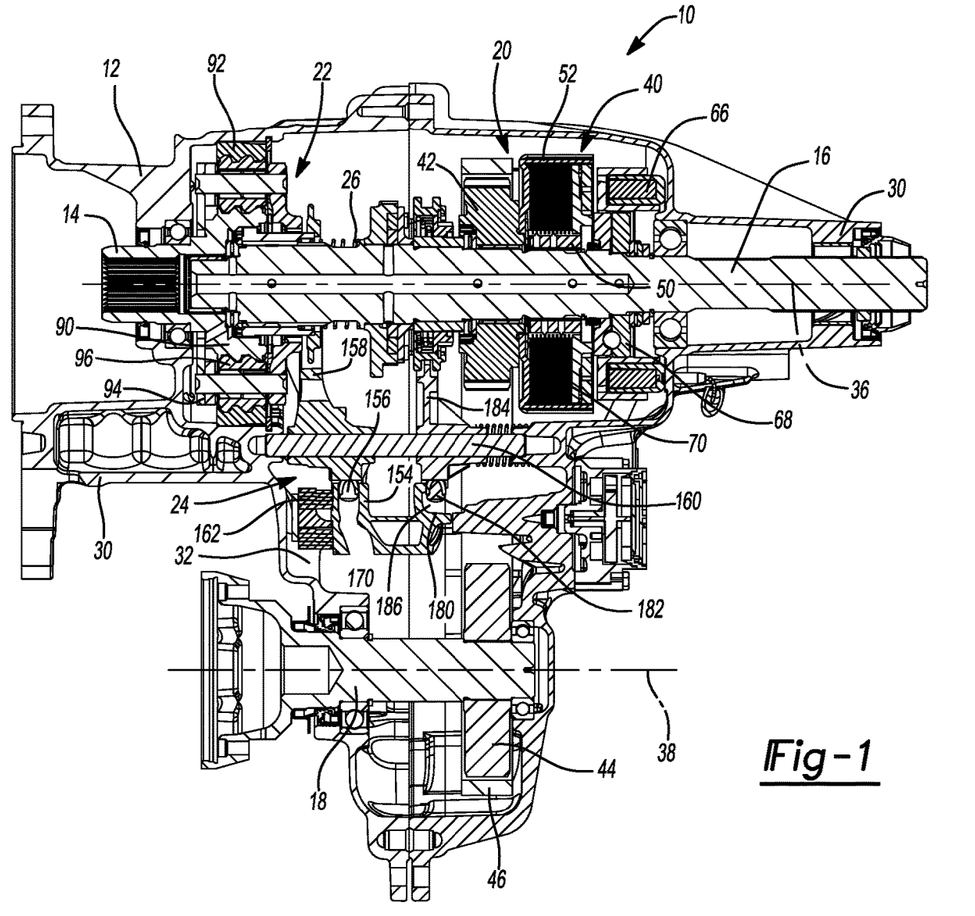
FIG. 1 is a longitudinal cross-section of an exemplary vehicle driveline component constructed in accordance with the teachings of the present disclosure.

With reference to FIG. 1 of the drawings, an exemplary vehicle driveline component constructed in accordance with the teachings of the present disclosure is generally indicated by reference numeral 10. In the particular example provided, the vehicle driveline component 10 is a transfer case, but it will be appreciated that the teachings of the present disclosure have application to various other vehicle driveline components, including power take-off units and axle assemblies.

The vehicle driveline component 10 can include a housing 12, a first shaft 14, a second shaft 16, a third shaft 18, a drive assembly 20, a two-speed transmission 22, an actuator 24 and a failsafe spring 26.

The housing 12 can be formed in halves 30 and can cooperate to define an internal cavity 32. The first shaft 14, which can be an input shaft, can extend into the internal cavity 32 and can be supported by the housing 12 for rotation about a primary axis 36. The second shaft 16, which can be a first output shaft, can extend into the internal cavity 32 and can be supported by the housing 12 for rotation about the primary axis 36. The third shaft 18, which can be a second output shaft, can extend into the internal cavity 32 and can be supported by the housing 12 for rotation about a secondary axis 38.

The drive assembly 20 can include a first mode clutch 40, a first sprocket 42, a second sprocket 44 and a chain assembly 46. The first mode clutch 40 can have a first clutch input 50, which can be coupled to the second shaft 16 for rotation therewith, and a first clutch output 52 that is rotatable about the primary axis 36. The first mode clutch 40 can be any type of clutch or coupling, but is a friction clutch in the example provided. The first sprocket 42 is coupled to the first clutch output 52 for rotation therewith. The second sprocket 44 is coupled to the third shaft 18 for rotation therewith about the secondary axis 38. The chain assembly 46 is engaged to the first and second sprockets 42 and 44 and transmits rotary there between.

The first mode clutch 40 can be operated in a first mode, in which the first clutch output 52 is rotationally decoupled from the first clutch input 50 so that rotary power is not transmitted between the second shaft 16 and the first sprocket 42. When the first mode clutch 40 is operated in the first mode, rotary power is not transmitted from the second shaft 16 through the drive assembly 20 to the third shaft 18. The first mode clutch 40 can also be operated in a second mode, in which the first clutch output 52 is rotationally coupled to the first clutch input 50 so that rotary power is transmitted between the second shaft 16 and the first sprocket 42. When the first mode clutch 40 is operated in the second mode, rotary power is transmitted from the second shaft 16 through the drive assembly 20 to the third shaft 18 to cause the third shaft 18 to rotate about the secondary axis 38.

Figure 2:
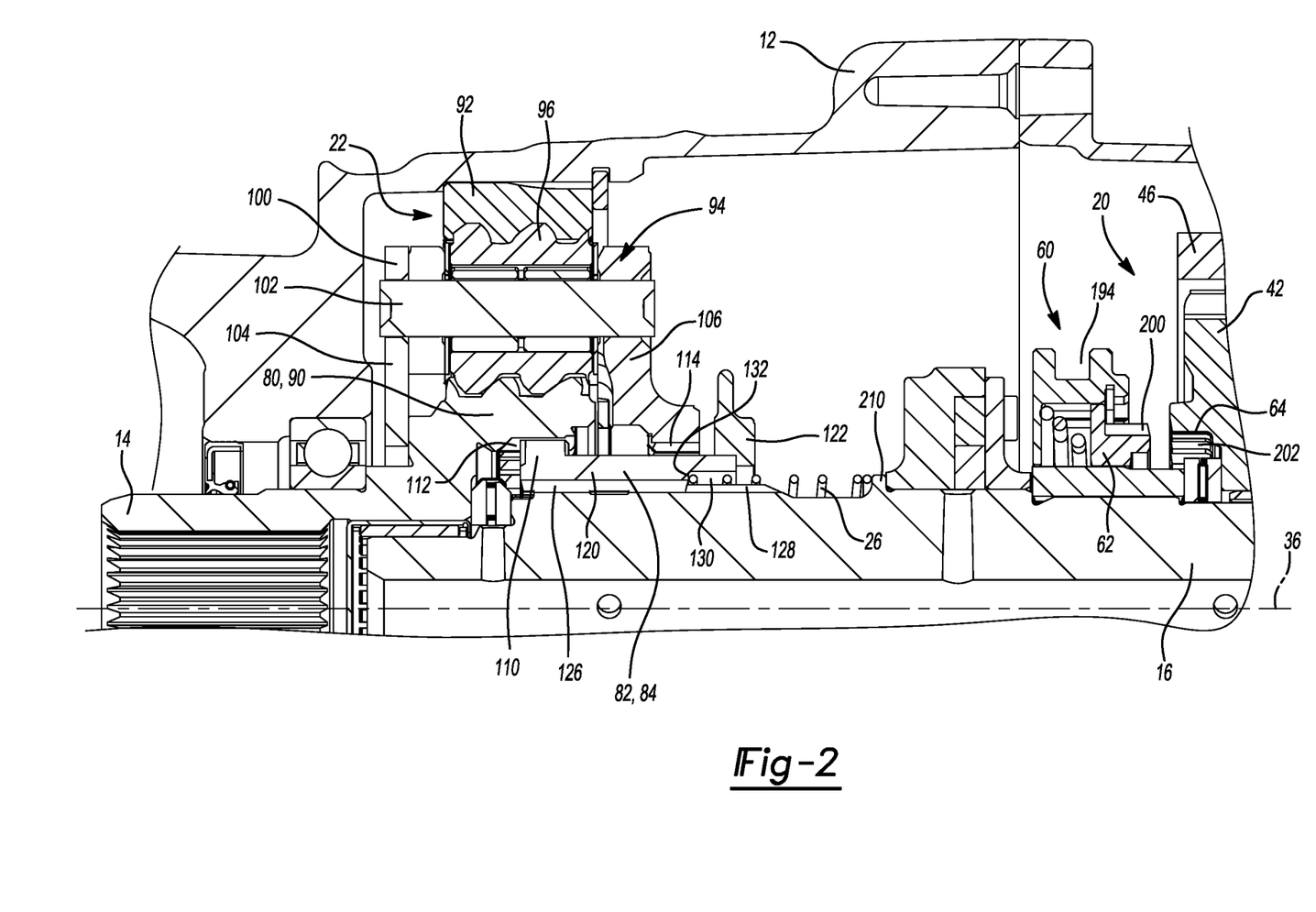
FIG. 2 is an enlarged portion of FIG. 1, illustrating a movable member of a two-speed transmission in a high-speed position.

With reference to FIG. 2, the drive assembly 20 can optionally include a second mode clutch 60, which can be a dog clutch. The second mode clutch 60 can have a second clutch input 62, which can be non-rotatably but axially slidably coupled to the second shaft 16, and a second clutch output 64 that is coupled to the second clutch output 64 for rotation therewith about the primary axis 36. The second mode clutch 60 can be operated in a third mode, in which the second clutch output 64 is rotationally decoupled from the second clutch input 62, and a fourth mode in which the second clutch output 64 is rotationally coupled to the second clutch output 64.

With reference to FIGS. 1 and 2, the provision of the first and second mode clutches 40 and 60 (and their operation in an alternative manner) permits variation in the manner in which rotary power may be transmitted between the second shaft 16 and the first sprocket 42. For example, the first mode clutch 40 could be employed to provide relatively instantaneous torque transmission between the second shaft 16 and the first sprocket 42, and/or to control or variably limit the amount of torque that is transmitted between the second shaft 16 and the first sprocket 42. To facilitate operation of the first mode clutch 40 in this manner, an electromagnet 66 can be employed to operate a ball-ramp actuator 68 to modulate a force that is applied to a clutch pack 70 in the first mode clutch 40. It will be appreciated that transmission of rotary power through the first mode clutch 40 requires ongoing operation of the electromagnet 66, as well as continuous access to electrical power for powering the electromagnet 66. The dog-clutch configuration of the second mode clutch 60 permits the first sprocket 42 to be rotationally coupled to the second shaft 16 without the need for a continuous electrical power. In this regard, the second mode clutch 60 can be operated to rotationally couple the first sprocket 42 to the second shaft 16 when rotary power is to be provided to the third shaft 18 for an extended period of time, or when for a period of time in which the vehicle driveline component 10 will not be operated (e.g., when a vehicle equipped with the vehicle driveline component 10 is turned off and placed in "park").

In FIG. 2, the two-speed transmission 22 can be any type of transmission and can generically include a transmission input 80, a transmission output 82, and a movable member 84. The transmission input 80 can be driven by the first shaft 14 for rotation therewith, while the transmission output 82 can be coupled to the second shaft 16 for rotation therewith. The movable member 84 is movable along the primary axis 36 between a high-speed position (shown in FIG. 2), in which the two-speed transmission 22 operates in a first gear ratio, and a low-speed position (shown in FIG. 3) in which the two-speed transmission 22 operates in a second gear ratio that provides a higher speed reduction than the first gear ratio.

In the example provided, the two-speed transmission 22 is a single-stage planetary transmission having a sun gear 90, a ring gear 92, a planet carrier 94 and a plurality of planet gears 96. The sun gear 90 can be the transmission input 80 and can be coupled to the first shaft 14 for rotation therewith. The ring gear 92 can be non-rotatably coupled to the housing 12. The planet carrier 94 is rotatable about the primary axis 36 and can have a carrier body 100 and a plurality of pins 102. The carrier body 100 can have first and second annular plates 104 and 106 that can be spaced apart from one another along the primary axis 36. The pins 102 can be fixedly coupled to and span between the first and second annular plates 104 and 106. Each of the planet gears 96 can be journally supported by an associated one of the pins 102 and can be meshingly engaged to the sun gear 90 and the ring gear 92.

Figure 4:
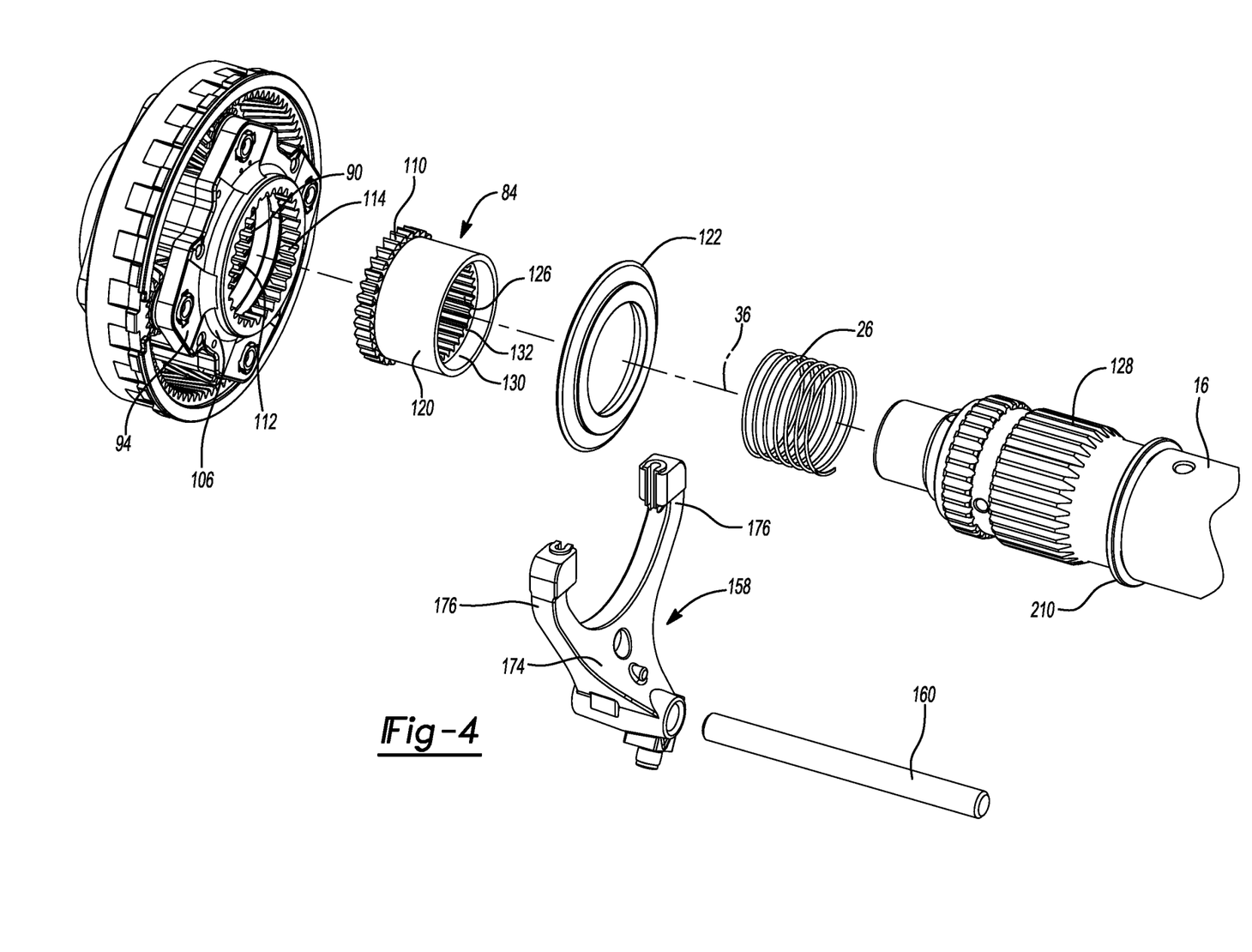
FIG. 4 is an exploded perspective view of a portion of the vehicle driveline component of FIG. 1, illustrating a portion of an actuator for moving the movable member and a failsafe spring.

With reference to FIGS. 2 and 4, the movable member 84 can be non-rotatably but axially slidably coupled to the second shaft 16 and can include a set of external teeth 110 that can be selectively coupled to a set of first internal teeth 112, which are formed on the sun gear 90, or to a set of second internal teeth 114 that can be formed on the second annular plate 106. In the example shown, the movable member 84 includes a hollow sleeve-like structure 120 and an annular member 122 that is fixedly coupled to an axial end of the sleeve-like structure 120. The set of external teeth 110 can be formed on the sleeve-like structure 120 on an axial end that is opposite the annular member 122. The sleeve-like structure 120 can define a set of female spline teeth 126, which are configured to matingly engage with a set of male spline teeth 128 formed on the second shaft 16, and a spring bore 130 that terminates at an internal shoulder 132.

Figure 3:
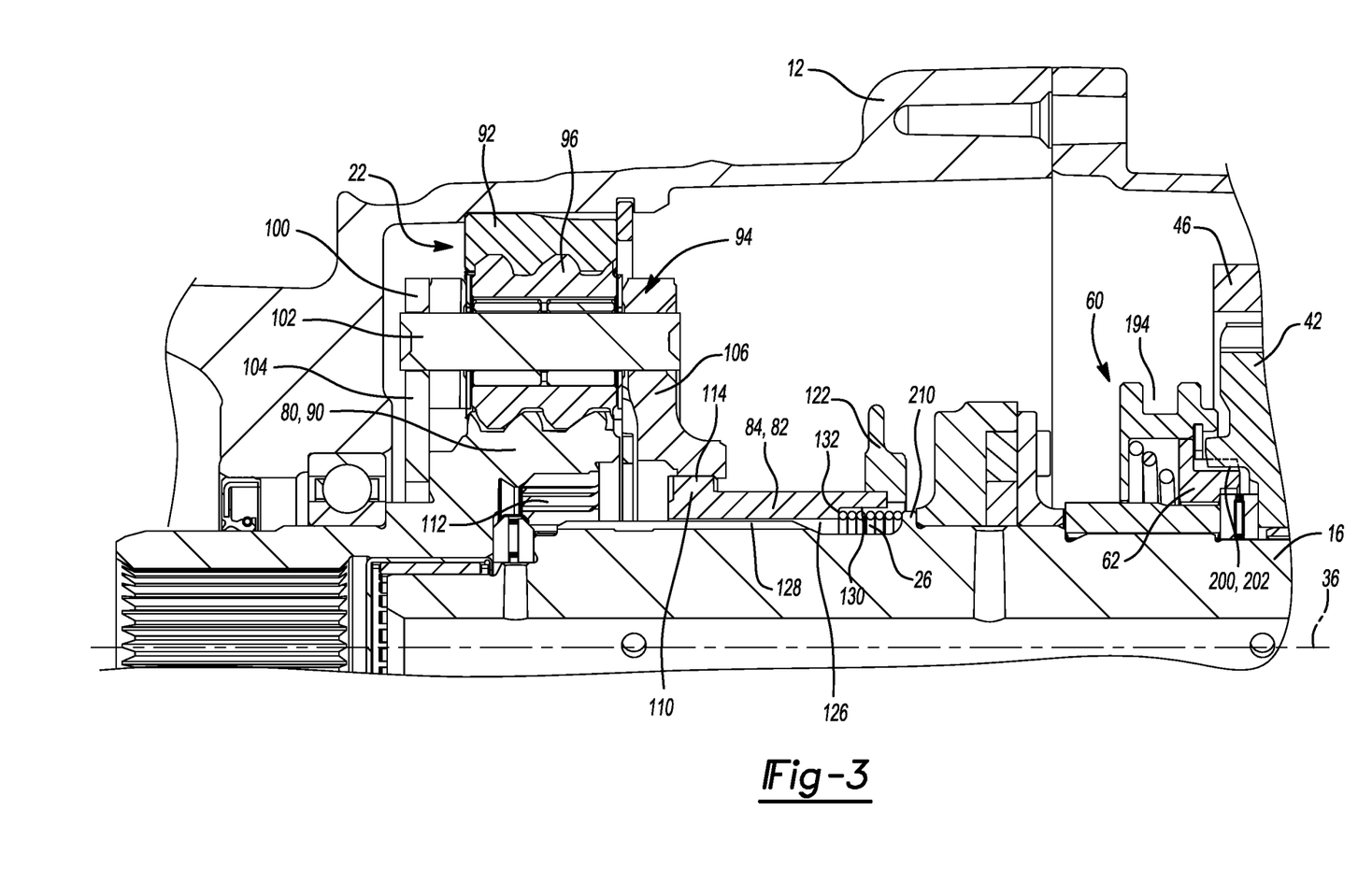
FIG. 3 is similar FIG. 2 but depicts the movable member in a low-speed position.

When the movable member 84 is in the high-speed position, the set of external teeth 110 on the movable member 84 are meshingly engaged with the set of first internal teeth 112 on the sun gear 90 and the two-speed transmission operates in a 1:1 speed ratio (i.e., a speed ratio where the rotational speed of the transmission output 82 is equal to the rotational speed of the transmission input 80). When the movable member 84 is in the low-speed position, the set of external teeth 110 on the movable member 84 are meshingly engaged with the set of second internal teeth 114 on the second annular plate 106 and the two-speed transmission operates in a speed ratio that is dependent upon the reduction ratio that is provided by the planetary transmission.

Figure 5:
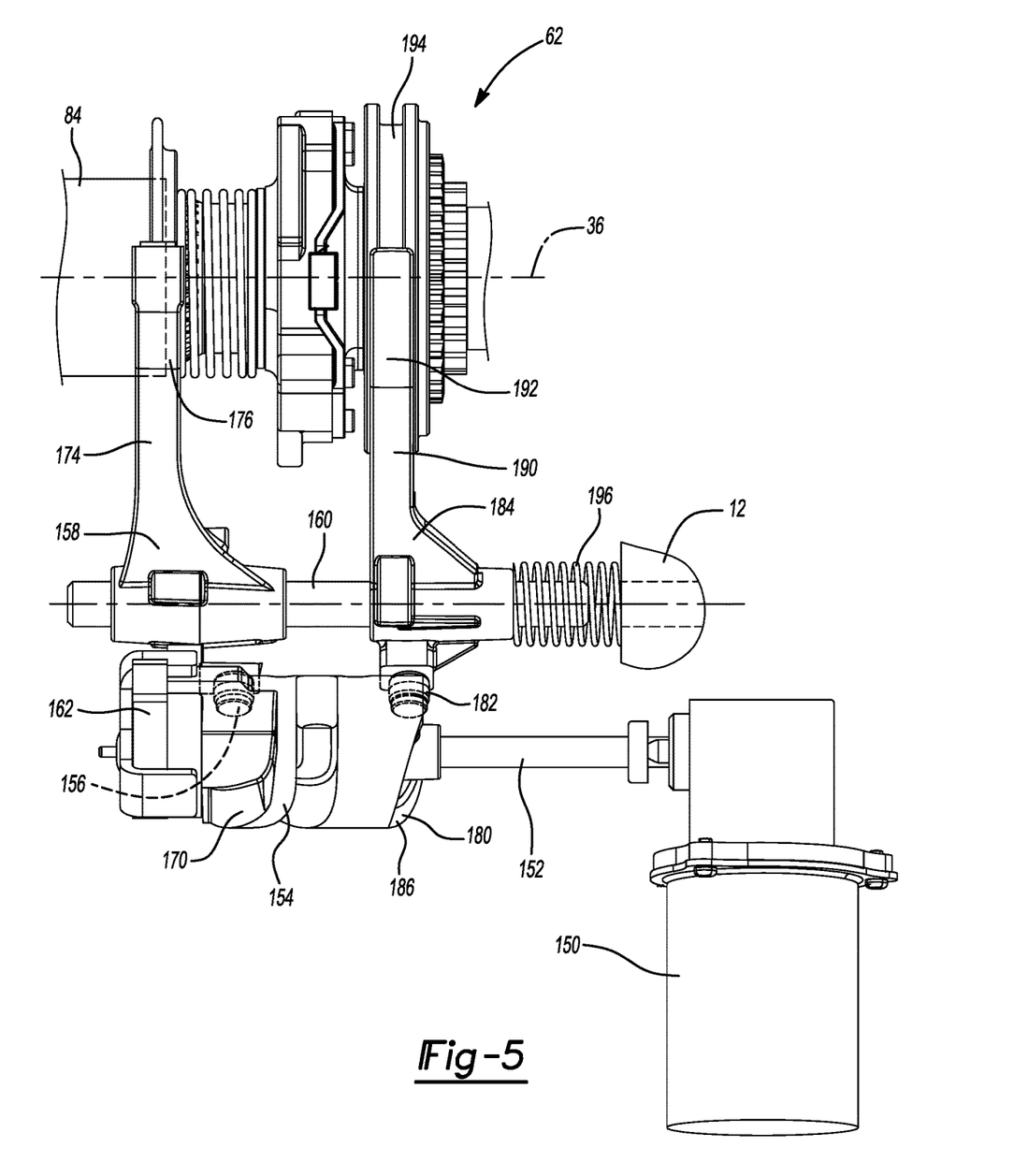
FIG. 5 is a perspective view of a portion of the vehicle driveline component of FIG. 1, depicting a portion of the actuator in more detail.

With reference to FIG. 5, the actuator 24 can comprise any means for selectively moving the movable member 84 between the high-speed and low-speed positions. In the particular example provided, the actuator 24 is generally similar to the actuator that is described in commonly assigned U.S. Pat. No. 5,771,477, the disclosure of which is incorporated by reference. Briefly, the actuator 24 includes a rotary drive motor 150, a spindle 152 that is driven by the drive motor 150, a first cam 154 that is rotatably disposed about the spindle 152, a first cam follower 156, a first shift fork 158, a fork shaft 160 and a torsion spring 162 that couples the spindle 152 to the first cam 154. The first cam 154 defines a first cam path 170 that spirals about a rotational axis of the first cam 154 and spindle 152. The first cam follower 156 can be received in the first cam path 170 and can move axially along the rotational axis of the first cam 154 in response to rotation of the first cam 154 about its rotary axis. The fork shaft 160 is fixed to the housing 12 and extends parallel to the rotational axis of the first cam 154 and the spindle 152. The first shift fork 158 is slidably mounted to the fork shaft 160 and includes a generally U-shaped fork structure 174 having a pair of arms 176 that are configured to receive the annular member 122 of the movable member 84 in a manner that limits relative axial movement between the first shift fork 158 and the annular member 122 but permits rotation of the annular member 122 relative to the first shift fork 158. The torsion spring 162 is a type of compliance spring that permits rotation of the spindle 152 without corresponding rotation of the first cam 154 or axial motion of the first shift fork 158.

Optionally, the actuator 24 can also include a second cam 180, a second cam follower 182 and a second shift fork 184. The second cam 180 can be coupled to the first cam 154 for rotation therewith and can define a second cam path 186. The second cam follower 182 can be received in the second cam path 186 and can move axially along the rotational axis of the second cam 180 in response to rotation of the second cam 180 about its rotary axis. The second shift fork 184 can be slidably mounted on the fork shaft 160 and can include a generally U-shaped fork structure 190 having a pair of arms 192. The arms 192 are received in an annular groove 194 (FIG. 2) in the second clutch input 62 and engage the second clutch input 62 in a manner that limits relative axial movement between the second shift fork 184 and the second clutch input 62 but permits rotation of the second clutch input 62 relative to the second shift fork 184. A return spring 196 could be disposed between the housing 12 and the second shift fork 184 to bias the shift fork 184 along the fork shaft 160 such that the second clutch input 62 is correspondingly biased in the second direction along the primary axis 36 (i.e., in a direction that tends to space the second clutch input 62 apart from the second clutch output 64 (FIG. 2) so that the second clutch input 62 is rotatable relative to the second clutch output 64 (FIG. 2)).

It will be appreciated that rotation of the first and second cams 154 and 180 (caused by operation of the rotary drive motor 150 and rotation of the spindle 152) can translate the first and second shift forks 158 and 184 along the primary axis 36 to correspondingly translate the movable member 84 and the second clutch input 62, respectively. It will also be appreciated that the inability of the movable member 84 to translate along the primary axis 36 in a first direction into the low-speed position (due to blocking contact between the set of external teeth 110 and the set of second internal teeth 114) can cause the torsion spring 162 to coil and store energy that can be released when the set of external teeth 110 on the movable member 84 are aligned to the set of second internal teeth 114 on the second annular plate 106 to permit the movable member 84 to fully shift into the low-speed position. It will also be appreciated that the inability of the second clutch input 62 to translate along the primary axis 36 in the first direction into a position where teeth 200 (FIG. 2) on the second clutch input 62 engage teeth 202 (FIG. 2) on the second clutch output 64 (FIG. 2) can cause the torsion spring 162 to coil and store energy that can be released when the teeth 200 (FIG. 2) on the second clutch input 62 are aligned to the teeth 202 (FIG. 2) on the second clutch output 64 (FIG. 2) to permit the second clutch input 62 to shift along the primary axis 36 so that the second mode clutch 60 (FIG. 2) operates in the fourth mode.

Returning to FIGS. 2 and 4, the failsafe spring 26 can be any type of spring, such as a wave spring or a helical compression spring, and can be disposed coaxially on the second shaft 16. The failsafe spring 26 can be configured to exert a force on the movable member 84 that would tend to move the movable member 84 in a second direction along the primary axis 36 from the low-speed position to the high-speed position. In the example provided, the failsafe spring 26 is a helical compression failsafe spring 26 having a first end, which is received into the spring bore 130 and abutted against the internal shoulder 132, and a second end that is abutted against an axially stationary feature 210 that is coupled to the second shaft 16. The axially stationary feature 210 can be a shoulder that is fixed to (e.g., unitarily and integrally formed with) the second shaft 16.

In the event of a failure in which the position of the movable member 84 ceases to be responsive to the operation of the actuator 24 (FIG. 1), such as a situation in which the first shift fork 158 breaks, the failsafe spring 26 can urge the movable member 84 along the primary axis 36 into the high-speed position, as well as maintain the movable member 84 in the high-speed position during operation of the vehicle driveline component 10 (FIG. 1).

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A vehicle driveline component comprising:
   a housing;
   a first shaft supported by the housing for rotation about a rotary axis;
   a second shaft supported by the housing for rotation about the rotary axis;
   a shift fork having a fork structure that is movable along the rotary axis;
   a two-speed transmission in a power transmission path between the first and second shafts, the two-speed transmission having a movable member that is movable along the rotary axis between a high-speed position, in which the two-speed transmission operates in a first gear ratio, and a low-speed position in which the two-speed transmission operates in a second gear ratio that provides a higher speed reduction between the first and second shafts than the first gear ratio, the movable member being coupled to the fork structure for movement therewith along the rotary axis; and
   a failsafe spring disposed coaxially about the rotary axis and being configured to move the movable member into the high-speed position in a situation where the movable member is axially de-coupled from at least a portion of the shift fork.

2. The vehicle driveline component of claim 1, wherein the two-speed transmission is a planetary transmission.

3. The vehicle driveline component of claim 2, wherein the movable member co-rotates with a planet carrier of the planetary transmission when the movable member is in one of the high and low-speed positions.

4. The vehicle driveline component of claim 2, wherein the movable member co-rotates with a sun gear of the planetary transmission in one of the high and low-speed positions.

5. The vehicle driveline component of claim 1, further comprising an actuator having a cam and a follower, the cam being rotatable about a cam axis that is parallel to the rotary axis, the follower being coupled to the shift fork and engaging the cam, the cam and the follower cooperating to convert rotary motion of the cam about the cam axis into translating motion of the shift fork along the rotary axis.

6. The vehicle driveline component of claim 1, wherein the first shaft is an input shaft, the second shaft is a first output shaft and wherein the vehicle driveline component further comprises a second output shaft, a first sprocket that is rotatable about the rotary axis, a second sprocket that is coupled to the second output shaft for rotation therewith, and a chain that is engaged to the first and second sprockets.

7. The vehicle driveline component of claim 6, further comprising a mode clutch that selectively transmits rotary power between the first output shaft and the first sprocket.

8. The vehicle driveline component of claim 7, wherein the mode clutch is a friction clutch.

9. The vehicle driveline component of claim 1, wherein the movable member is non-rotatably but axially slidably coupled to the second shaft.

10. The vehicle driveline component of claim 9, wherein the failsafe spring is disposed about the second shaft axially between the movable member, and wherein the failsafe spring has a first axial end, which is abutted against the movable member, and a second axial end, which is abutted against an axially stationary feature that is coupled to the second shaft.

11. The vehicle driveline component of claim 10, wherein the axially stationary feature is a shoulder that is fixed to the second shaft.

12. The vehicle driveline component of claim 10, wherein a portion of the failsafe spring is received coaxially into the movable member.

13. A method for operating a vehicle driveline component having a housing, first and second shafts supported by the housing for rotation about a rotary axis, a two-speed transmission in a power transmission path between the first and second shafts, a shift fork and an actuator, the two-speed transmission having a movable member that is movable along the rotary axis between a high-speed position, in which the two-speed transmission operates in a first gear ratio, and a low-speed position in which the two-speed transmission operates in a second gear ratio that provides a higher speed reduction between the first and second shafts than the first gear ratio, the shift fork being coupled to the movable member for movement therewith along the rotary axis, the actuator having a cam and a follower, the cam being rotatable about an axis that is parallel to the rotary axis, the follower being coupled to the shift fork and engaging the cam, the method comprising:
   transmitting rotary power from the first shaft through the two-speed transmission to the second shaft with the movable member in the high-speed position;
   operating the actuator to drive the cam about the cam axis in a first rotational direction such that the cam and the follower cooperate to translate the shift fork along the rotary axis to position the movable member in the low-speed position;
   transmitting rotary power from the first shaft through the two-speed transmission to the second shaft with the movable member in the low-speed position; and
   applying a force to the movable member via a failsafe spring that is disposed coaxially about the rotary axis, wherein the force applied by the failsafe spring is sufficient to move the movable member into the high-speed position when movement of the shift fork along the rotary axis is unresponsive to rotation of the cam.

* * * * *